United States Patent [19]

Fuchs, Jr.

[11] Patent Number: 4,484,689

[45] Date of Patent: Nov. 27, 1984

[54] AXIALLY SEGMENTED PRESSURE VESSEL

[76] Inventor: Francis J. Fuchs, Jr., P.O. Box 10016, Naples, Fla. 33940

[21] Appl. No.: 521,307

[22] Filed: Aug. 8, 1983

[51] Int. Cl.$^3$ .................. B21C 27/00; B65D 7/44
[52] U.S. Cl. ............................................ 220/3; 220/71; 220/408
[58] Field of Search .................. 220/3, 4 C, 71, 408

[56] References Cited

U.S. PATENT DOCUMENTS

| | | | |
|---|---|---|---|
| 3,101,860 | 8/1963 | Flick | 220/3 |
| 3,390,563 | 7/1968 | Fuchs, Jr. | 220/3 X |
| 3,433,382 | 3/1969 | Boggio | 220/3 |
| 3,512,675 | 5/1970 | Pennell | 220/3 |
| 4,040,284 | 8/1977 | Fuchs, Jr. | 220/3 X |
| 4,125,202 | 11/1978 | Schilling | 220/3 |

Primary Examiner—Steven M. Pollard
Attorney, Agent, or Firm—R. Gale Rhodes, Jr.

[57] ABSTRACT

The cylindrical liner and surrounding annular support structure of a pressure vessel are segmented axially with the axial segments of the liner being slightly longer than the axial segments of the annular support structure to provide an axial space between opposed annular support structure segments to permit substantially uniform axial compressive stress to be produced along the entire length of said axially segmented cylindrical liner and to seal opposed intermediate annular surfaces of cylindrical liner axial segments; the axial segmentation also provides economies of original cost, repair and replacement costs and ease of assembly and disassembly.

3 Claims, 5 Drawing Figures

U.S. Patent    Nov. 27, 1984    Sheet 1 of 3    4,484,689
FIG. 1
PRIOR ART
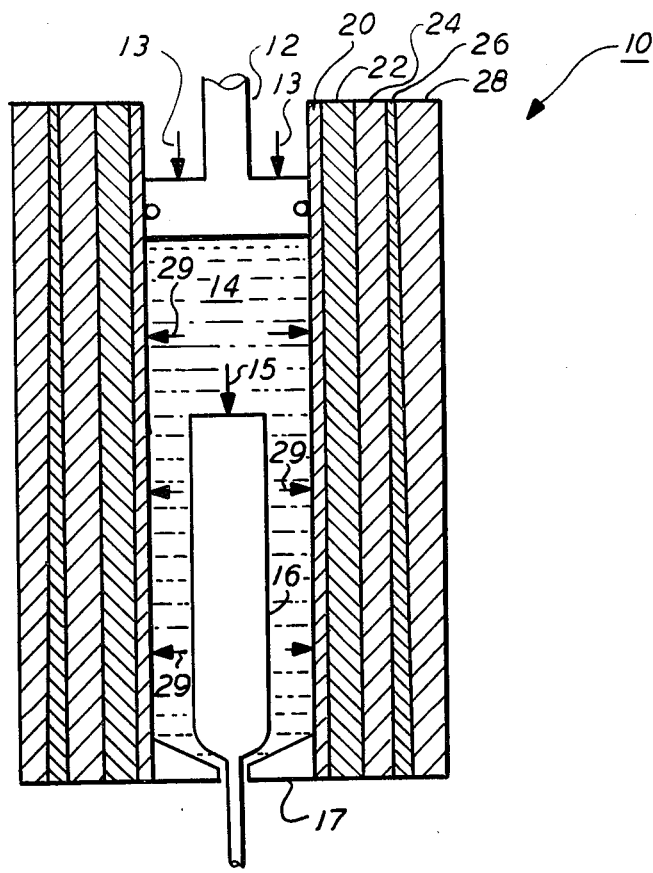
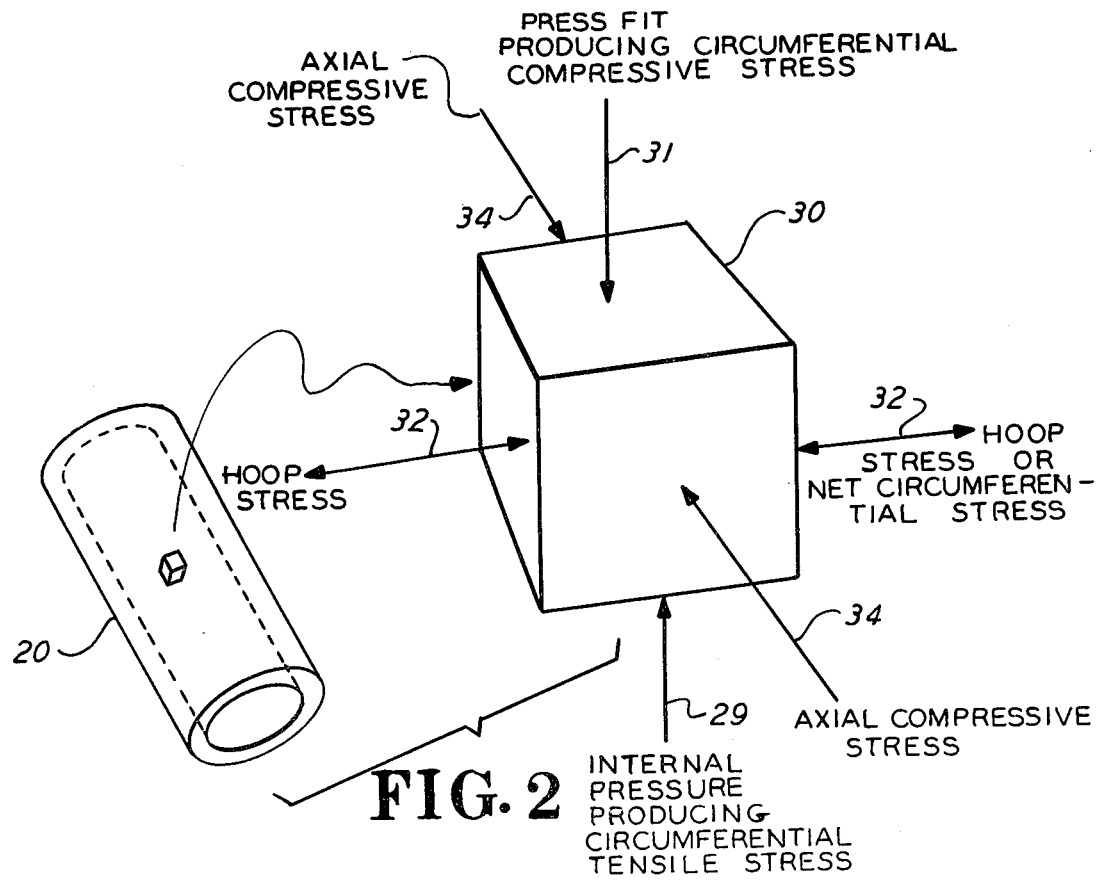

AXIALLY SEGMENTED PRESSURE VESSEL

BACKGROUND OF THE INVENTION

This invention relates generally to a new and improved pressure vessel and more particularly relates to an axially segmented pressure vessel providing, inter alia, economies of original cost, repair, assembly and disassembly.

Shown in FIG. 1 of the drawings is a typical prior art pressure vessel, indicated by general numerical designation 10, and associated with this pressure vessel are prior art pressure vessel problems and disadvantages overcome by the improved pressure vessel of the present invention. The pressure vessel 10 is illustrated schematically, in vertical cross-section, in context of a pressure vessel for hydrostatic extrusion apparatus including a piston 12 advancing or acting downwardly under the influence of pressure or force indicated by arrows 13 to pressurize and produce hydrostatic pressure in a body of pressure transmitting medium or hydrostatic fluid 14 to apply hydrostatic pressure indicated by arrow 15 to a billet 16 to hydrostatically extrude the billet through an extrusion die 17, in the manner known to those skilled in the hydrostatic extrusion art. The pressure vessel 10 includes a cylindrical liner 20 (typically made of a suitable high strength steel) surrounded radially outwardly by: cylindrical support member 22 (typically made of tungsten carbide), cylindrical support member 24 (typically made of a suitable high strength steel and typically segmented radially), a cylindrical taper ring 26 (typically made of a suitable high strength steel and whose taper is exaggerated in FIG. 1 for clarity of presentation), and a cylindrical support jacket 28 (typically made of a suitable high strength steel) press fitted over the taper ring 26 to apply inwardly directed force or pressure to pre-stress the liner 20 by producing circumferential compressive stress therein for opposing circumferential tensile stress produced in the liner by the pressurized pressure transmitting medium 14 which applies force or pressure to the liner 20 indicated by arrows 29 in FIG. 1. Thus, as understood by those skilled in the art, the circumferential compressive stress produced in the liner 20 by the press fit of the jacket 28 enhances the ability of the liner 20 to contain the pressurized medium 14.

Referring now to FIG. 2, the cylindrical liner 20 is illustrated schematically in perspective and an enlarged cube 30 of liner material is also illustrated schematically to provide a further understanding of the prior art problems and disadvantages associated with a prior art pressure vessel having a cylindrical liner, such as cylindrical liner 20, of unitary or non-segmented structure. As will be understood by reference to cube 30, internal pressure produced by the pressurized medium 14 (FIG. 1) is indicated by arrow 29 and produces circumferential tensile stress in the liner 20. As noted above, the press fit provided by the jacket 28 produces circumferential compressive stress in the liner indicated by arrow 31 in FIG. 2 for opposing the circumferential tensile stress. As further known by those skilled in the art, hoop stress, indicated by double headed arrow 32 in FIG. 2, will be the net circumferential stress produced in the cube 30, and hence in liner 20, by the opposed effect of the compressive and tensile stresses indicated by arrows 29 and 31. As is still further known to those skilled in the art, good pressure vessel design indicates that upon the pressurized fluid medium 14 (FIG. 1) being pressurized to its working level, such as for example for hydrostatic extrusion of the billet 16, the circumferential compressive stress indicated by arrow 31 and provided by the press fit of jacket 28 will exactly equal and thereby oppose or neutralize the circumferential tensile stress produced in the cube 30, and hence in liner 20, by the pressurized fluid medium 14. However, and as still further known to those skilled in the art, and as may be further understood by reference to FIG. 2, if axial compressive stress, indicated by opposed arrows 34 in FIG. 2 were to be applied to the cube 30, and hence to liner 20, such axial compressive stress will cooperate with the circumferential compressive stress indicated by arrow 31 to further oppose the circumferential tensile stress indicated by arrow 29 whereby the ability of the liner 20 to contain the pressurized medium 14 will be further enhanced.

The production of such axial compressive force in the liner 20, since it is of unitary or non-segmented structure, has an attendant problem which may be understood by reference to FIG. 3. The application of axially inwardly directed force or pressure to the opposed ends of the liner 20 does not produce uniform axial compressive stress throughout the entire length of the liner 20, indicated by length L1 in FIG. 3, but instead merely produces axial compressive stress at the opposed end portions of the length of the cylindrical liner which axial compressive stress decreases from each end to zero along the middle portion of the length L1 of the liner 20, and hence, the longer the length L1 of the liner 20, the less uniform axial compressive stress will be present along the entire length of the liner. However, as may be further understood by reference to FIG. 3, were the cylindrical liner 20 to be segmented axially along its length L1 into axially segmented lengths L2, L3 and L4, each such axially segmented length would experience the same generally axial compressive stress curve or profile as that of the longer length L1 but since the axially segmented length L2, L3 and L4 are shorter than L1, the axial stress in each such segmented axial length would not decrease to zero as shown and hence the net effect would be an average, and therefore substantially uniform, axial compressive stress along the axially segmented length L2, L3 and L4 as indicated by the averaging line A in FIG. 3. The improved pressure vessel of the present invention, as taught in detail below, provides such average, and therefore substantially uniform, axial compressive stress along the length of an axially segmented pressure vessel cylindrical liner.

Referring again to FIG. 1, and the typical prior art pressure vessel indicated by general numerical designation 10, it will be noted that the radially outward support members, for example the annular jacket 28, are also of unitary construction, are not segmented axially, and hence each such support member typically must be made from a relatively long forging. As further known to those skilled in the art, the longer the length of a forging the more expensive the forging and hence were such radially outward support members to be segmented axially they could be made from shorter forgings thereby reducing the cost of the pressure vessel. Also, it will be understood that the axial length of commercially available forgings is limited by the present technology and thus the shorter the length of the axial forgings required, the more competitive the sources and the less such forgings typically cost.

In addition, as will be understood, the longer the axial length of the radially outward support members, in particular the longer the axial length of the tapered annular support jacket 28, the greater the force required to press fit the jacket over the taper ring 26 and the other radially inward support members. The greater such force, the greater the cost of the equipment required to produce such force, and hence the greater the assembly cost of the pressure vessel and therefore the greater the cost of the pressure vessel; similarly, the greater the disassembly cost.

Still further, and referring again to FIG. 1, the longer the axial length of the cylindrical liner 20 the greater its cost and hence if the liner suffers damage at any point along its length, such as damage caused by galling due to foreign hard particles inside the liner, overpressurization of the liner, or axial misalignment of the piston 12 with the liner, the entire pressure vessel must be disassembled to repair or replace the liner and if the damage is sufficiently severe at any point the entire liner can require replacement.

As taught in detail below, the improved axially segmented pressure vessel of the present invention overcomes these additional prior art problems and disadvantages.

SUMMARY OF THE INVENTION

The cylindrical liner and surrounding annular support structure of a pressure vessel are segmented axially with the axial segments of the liner being slightly longer than the axial segments of the annular support structure to provide an axial space between opposed annular support structure segments to permit substantially uniform axial compressive stress to be produced along the entire length of said axially segmented cylindrical liner and to seal opposed intermediate annular surfaces of cylindrical liner axial segments; the axial segmentation also provides economies of original cost, repair and replacement costs and ease of assembly and disassembly.

DESCRIPTION OF THE DRAWINGS

FIG. 1 is a schematical illustration, in a vertical cross-section, of a typical prior art pressure vessel;

FIG. 2 is a composite view, in perspective, of the cylindrical liner of a pressure vessel and a tube of cylindrical liner material illustrating the production of various stresses in the cylindrical liner;

DESCRIPTION OF THE PREFERRED EMBODIMENT

Figure 5:
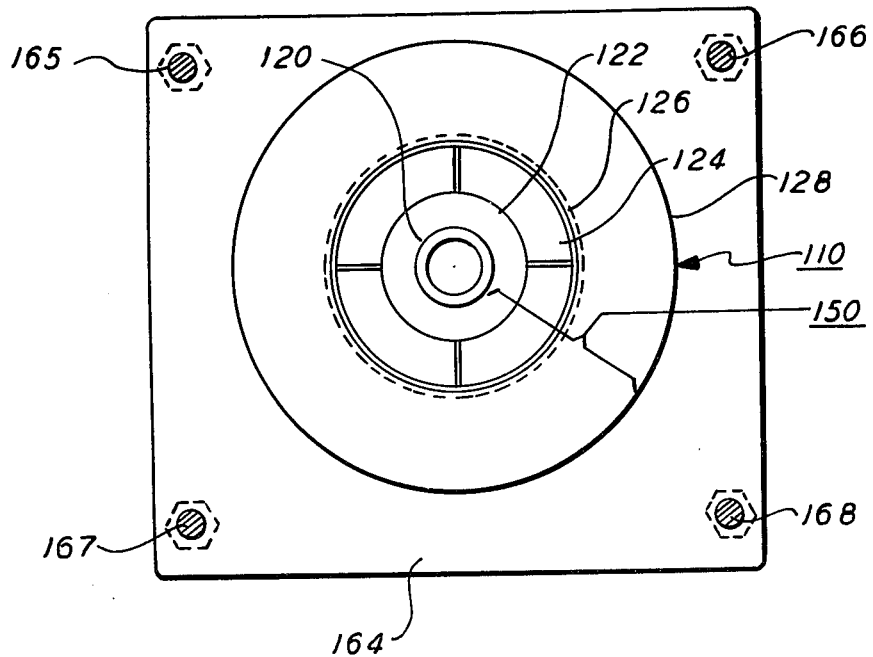
FIG. 5 is a view taken along the line 5—5 in FIG. 4 in the direction of the arrows.
Figure 4:
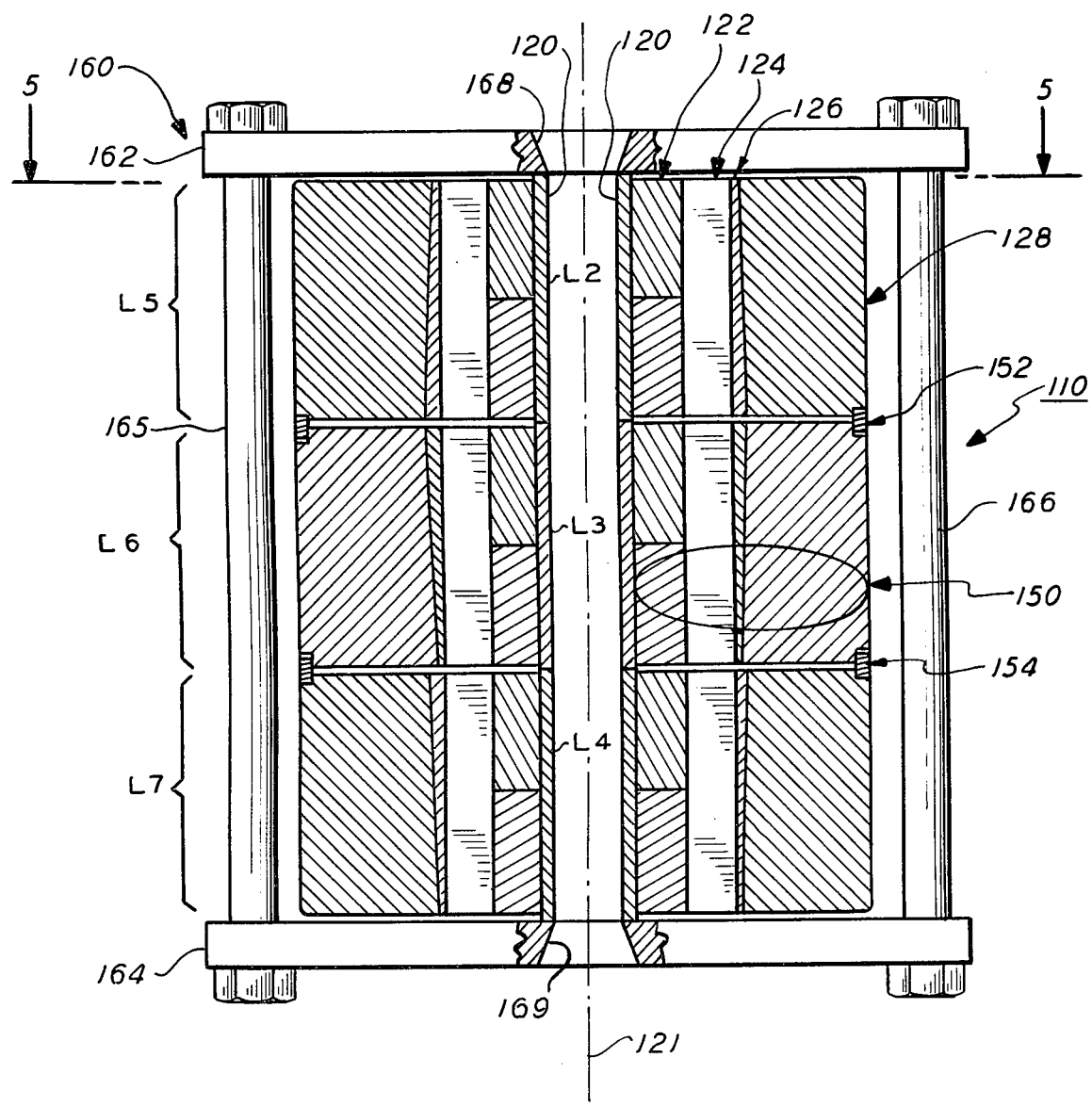
FIG. 4 is a schematical illustration, in vertical cross-section, of the axially segmented pressure vessel of the present invention.

Referring now to FIGS. 4 and 5, and in particular to FIG. 4, there is shown an axially segmented pressure vessel embodying the present invention and indicated by general numerical designation 110. The pressure vessel includes a cylindrical liner 120 having a center line 121 and being segmented axially into axial cylindrical segments L2, L3 and L4. The pressure vessel 110 further includes annular support structure indicated generally by numerical designation 150 and which may include cylindrical support member 122, cylindrical support member 124, a cylindrical taper ring 126, and a cylindrical support jacket 128. It will be understood that as used in the context of this specification and the appended claims that the term "annular support structure" is used to describe the radially outward annular support structure supporting the axially segmented cylindrical liner 120 whether such annular support structure is segmented radially as illustrated in FIGS. 4 and 5, otherwise segmented radially, or of unitary or monolithic structure; the specific structure of such annular support structure is not germaine to the present invention and it will be further understood that the annular support structure illustrated in FIGS. 4 and 5 is merely to provide a background for understanding the teachings of the present invention. The annular support structure is segmented axially into axial annular segments L5, L6 and L7, as shown in FIG. 4, and it will be understood that the axial length of axial segments L2, L3 and L4, is greater, by a predetermined amount, than the axial length of axial segments L4, L5 and L6. The difference in axial length, as may be best seen from FIG. 4, causes the axial annular segments L5, L6 and L7 to be spaced apart axially as shown by the spaces therebetween in FIG. 4. It will be understood that each axial cylindrical segment resides axially centrally of one of the axial annular segments and hence each cylindrical segment extends axially beyond the annular segment in each direction a distance equal to one-half of the amount that the axial length of the cylindrical segments exceeds the axial length of the annular segments; thus, the axial spacing between adjacent axial annular segments is equal to the difference in axial length between the cylindrical segments and the annular segments.

A plurality of annular registration rings 152 and 154 are provided for maintaining the axial annular pressure vessel segments L5, L6 and L7 in radial registration with the center line 121. The opposed outer peripheral portions of adjacent pressure vessel annular segments are relieved radially inwardly as shown in FIG. 4 to provide in combination annular grooves in which the registration rings reside. For a purpose set forth below, it will be noted that the axial length of these annular grooves is greater than the axial length of the registration rings 152 and 154.

Figure 3:
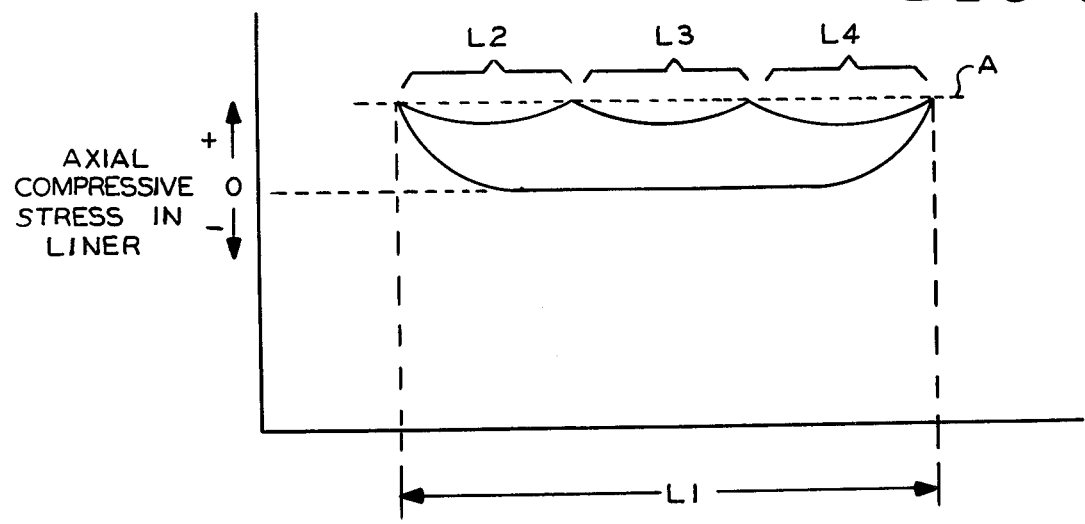
FIG. 3 is a graph illustrating the production of substantially uniform axial compressive stress in pressure vessel cylindrical liner segmented axially in accordance with the teachings of the present invention.

Compression apparatus, indicated by general numerical designation 160, is provided for producing substantially uniform axial compressive stress in the axial cylindrical segments L2, L3 and L4. This apparatus, as may be noted from FIGS. 4 and 5, may include rectangular compression members 162 and 164 interconnected by a plurality of tie rods 165, 166, 167 and 168, the tie rods, as shown, are provided with suitable nuts for tightening in the manner known to those skilled in the tie rod art. It will be noted from FIG. 4 that the compression members 162 and 164 engage the outer annular end surfaces of the cylindrical cylinder 120 and hence, upon the tie rods being tightened a suitable amount, and since the axial length of the grooves in which the registration rings reside is greater than the axial length of the rings the entire compressive force or pressure applied by the compression members 162 and 164 acts solely on the axially aligned cylindrical segments L2, L3 and L4 to produce therein the substantially uniform compressive axial stress indicated by the averaging line A in FIG. 3 and to seal the opposed intermediate annular surfaces of adjacent cylindrical segments to prevent a pressurized medium (e.g. pressurized medium 14 of FIG. 1) from escaping therebetween. Accordingly, it will be understood that such substantially uniform compressive axial stress cooperates with the circumferential compressive stress produced in the cylindrical liner 120 by the annular pressure vessel support structure 150 to further enhance the ability of the liner to contain a pressurized medium.

It will be noted, from FIG. 4, that the compression members 162 and 164 are each provided with an inwardly tapered central aperture whose smaller diameter is equal to the inner diameter of the liner 120 thereby facilitating access to the cylindrical liner through the apertures; apertures being numbered 168 and 169.

It will be understood that the axially segmented pressure vessel of the present invention, described in detail below, overcomes the disadvantages and problems associated with typical prior art pressure vessels such as that shown in FIG. 1 and described above. More particularly, the axially segmented pressure vessel of the present invention due to its segmentation permits the use of shorter forgings with an attendant reduction in cost, and permits assembly and disassembly by less force with its attendant reduction in cost, particularly the press fitting of the outer jacket 128 over the taper ring 126. Still further, in the event that the axially segmented cylindrical liner 120 suffers any damage at any point along its length, the axially segmented pressure vessel 110 may be readily disassembled and only that axial cylindrical segment of the liner suffering such injury need be replaced with the other axial cylindrical segments being reusable and not requiring replacement.

In an embodiment of the axially segmented pressure vessel of the present invention, the I.D. of the cylindrical liner 120 was 0.75 inch and the O.D. of the annular support jacket 128 was 6 inches, the cylindrical liner, annular support member 124, taper ring 126, and support jacket 128 were made of a suitable high strength steel, the annular support member 122 was made of a suitable tungsten carbide and was segmented radially as shown in FIG. 5, the axial length of the axial cylindrical segments L2, L3 and L4 of the liner 120 was 2.510 inches and the axial length of the annular support members was 2.500 inches; hence, the axial length of the axial cylindrical segments L2, L3 and L4 of the cylindrical liner 120 exceeded the axial length of the axial annular segments L5, L6 and L7 by 0.010 inch. The annular support jacket 128 was press-fitted to produce circumferential stress of approximately 250,000 psi in the cylindrical liner 120 and the tie rods 165–168 were tightened to cause the compression members 162 and 164 to produce axial compressive stress in the cylindrical liner of approximately 250,000 psi.

It will be understood that many modifications and variations of the present invention may be made without departing from the spirit and the scope thereof.

What is claimed is:

1. In a pressure vessel including a cylindrical liner for surrounding and containing a pressurized meduim applying radially outwardly directed pressure to said liner producing circumferential tensile stress therein and annular pressure vessel support structure surrounding and engaging said liner and applying radially inwardly directed pressure to said liner producing circumferential compressive stress therein opposing said tensile stress, said circumferential compressive stress enhancing the ability of said liner to contain said pressurized medium, said pressure vessel having a center line, wherein the improvement comprises:

said annular pressure vessel support structure segmented axially into annular segments of a first axial length and said cylindrical liner segmented axially into cylindrical segments of a second axial length greater than said first axial length by a predetermined axial length, each liner cylindrical segment residing axially centrally of one of said pressure vessel annular segments and extending in each axial direction beyond said pressure vessel annular segment an axial length equal to substantially one-half said predetermined axial length to cause adjacent pressure vessel annular segments to be spaced apart axially a distance equal to said predetermined axial length;

a plurality of annular registration rings, each registration ring engaging predetermined outer peripheral portions of adjacent pressure vessel annular segments and for maintaining said annular segments in radial registration with said center line; and compression means for producing substantially uniform axial compressive stress in said axially segmented cylindrical liner, said axial compressive stress cooperating with said circumferential compressive stress to further enhance the ability of said liner to contain said pressurized medium.

2. Pressure vessel according to claim 1 wherein said cylindrical liner has outer annular end surfaces at the opposite outer ends thereof and wherein adjacent liner cylindrical segments have opposed intermediate annular surfaces, and wherein said compression means comprise a pair of compression members interconnected by a plurality of tie rods, said compression members having a radially outward dimension larger than that of said pressure vessel annular segments and said tie rods extending along and spaced from the outer annular surfaces of said pressure vessel annular segments, said compression members for engaging said outer annular end surfaces of said liner and upon said tie rods being tightened said compression members applying axially inwardly directed pressure to said liner cylindrical segments producing said axial compressive stress in said liner and sealing said opposed intermediate annular surfaces to prevent escape of said pressurized medium.

3. Pressure vessel according to claim 2 wherein said cylindrical liner has an inner diameter and wherein each of said compression members is provided with an inwardly tapered central aperture in radial registration with said center line and wherein the smaller diameter of each tapered aperture is equal to said inner diameter of said liner thereby facilitating access to said cylindrical liner through said apertures.

* * * * *